United States Patent
Myers et al.

(10) Patent No.: US 6,998,811 B2
(45) Date of Patent: *Feb. 14, 2006

(54) COMPENSATION METHOD FOR CURRENT-SENSOR GAIN ERRORS

(75) Inventors: Garold P Myers, Northville, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

This patent is subject to a terminal disclaimer.

(21) Appl. No.: 10/360,490

(22) Filed: Feb. 10, 2003

(65) Prior Publication Data

US 2004/0155620 A1    Aug. 12, 2004

(51) Int. Cl.
G05D 23/275 (2006.01)
H02P 5/28 (2006.01)
H02P 7/36 (2006.01)

(52) U.S. Cl. .................. 318/632; 318/727; 318/798; 318/806

(58) Field of Classification Search ............ 318/632, 318/633, 432, 798, 800, 806, 807, 808, 812, 318/727

See application file for complete search history.

(56) References Cited

U.S. PATENT DOCUMENTS

| | | | |
|---|---|---|---|
| 5,514,977 A | | 5/1996 | Agiman |
| 5,646,499 A | | 7/1997 | Doyama et al. |
| 5,814,967 A | | 9/1998 | Garces et al. |
| 5,850,132 A | | 12/1998 | Garces |
| 5,886,498 A | * | 3/1999 | Sul et al. ............... 318/821 |
| 5,998,957 A | * | 12/1999 | Tadmor et al. .......... 318/701 |
| 6,137,258 A | * | 10/2000 | Jansen .................... 318/802 |
| 6,163,127 A | * | 12/2000 | Patel et al. .............. 318/700 |
| 6,163,128 A | * | 12/2000 | Hiti et al. ............... 318/722 |
| 6,429,616 B1 | * | 8/2002 | Myers et al. ............ 318/459 |
| 6,448,735 B1 | * | 9/2002 | Gokhale et al. ........ 318/700 |
| 6,492,788 B1 | * | 12/2002 | Agirman et al. ....... 318/700 |
| 6,646,412 B2 | * | 11/2003 | Wu et al. ............... 318/801 |
| 6,703,809 B2 | * | 3/2004 | Royak et al. ........... 318/727 |
| 6,737,833 B2 | * | 5/2004 | Kalman et al. ......... 322/20 |
| 6,762,573 B2 | * | 7/2004 | Patel ...................... 318/254 |
| 6,844,690 B2 | * | 1/2005 | Kalman et al. ......... 318/100 |

OTHER PUBLICATIONS

Lorenz et al., "Rotor Position Estimation for Permanent Magnet Synchronous Motor Using Saliency-Tracking Self-Sensing Method," pp. 3-4 (2000).*

* cited by examiner

*Primary Examiner*—Marlon T. Fletcher
*Assistant Examiner*—Patrick Miller
(74) *Attorney, Agent, or Firm*—Artz & Artz, P.C.; Carlos L. Hanze (57) ABSTRACT

A method of compensation for current-sensor gain errors in an electric machine drive 14 includes a high frequency carrier signal electrically injected into the electric machine 14. A current-sensor signal of the electric machine 14 is determined. The current-sensor signal is separated into current-sensor carrier signal negative and current-sensor carrier signal positive sequence reference frames. A proportional compensator signal for one of the current-sensor carrier signal reference frames is generated in a feedback loop 24. A magnitude signal of another one of the current-sensor carrier signal reference frames is generated in a different feedback loop 26.

18 Claims, 8 Drawing Sheets

COMPENSATION METHOD FOR CURRENT-SENSOR GAIN ERRORS

TECHNICAL FIELD

The present invention relates generally to electric motors and, more particularly, to the operation of electric motors.

BACKGROUND ART

Current-sensors are often utilized in circuits for high performance control of electric machine drive systems and fault detection. In the automotive industry, applications include electric power assist steering and various other auxiliary systems and electric, hybrid electric and fuel cell electric vehicles. One primary difficulty experienced by robust control using current-sensors is obtaining an accurate and reliable sensed signal. Fluctuations, caused by device tolerances, temperature, age and noise, in the gains of current-sensors and their related circuits can affect the efficiency and accuracy of the system.

Current-sensor gains include input to output gain of the actual current-sensor and current-sensor to analog-to-digital (A/D) interface circuit gains.

Presently, precision compensation for current-sensor gain errors is accomplished through post-production manual calibration and tends to involve high cost precision devices and unreliable trim potentiometers. To maintain accuracy, these difficult manual calibrations are repeated at various times over the life of the system, or the gains used in software are periodically adjusted. Manual calibration cannot, however, substantially compensate for variations due to temperature effects and noise during operation of the system. Additionally, in a high volume production scenario, manual calibration is costly and time consuming, and it tends to make each system undesirably unique.

The disadvantages associated with current methods for compensating for current-sensor gain errors in electric machines have made it apparent that a new method to compensate for current-sensor gain errors is needed. The new technique should substantially reduce manual calibrations and should require relatively inexpensive components with low tolerance specifications. The new technique should also maintain a high level of accuracy and robustness. The present invention is directed to these ends.

SUMMARY OF THE INVENTION

The present invention provides a method for compensating for current-sensor gain errors in an electric machine system using an injected high frequency carrier signal.

In accordance with the present invention, a method of compensating for current-sensor gain errors in an electric machine drive is disclosed. In one aspect of the invention, the method includes the steps of activating the electric machine drive; exciting the electric machine with a high frequency carrier signal in addition to the fundamental excitation; determining a current-sensor signal of the electric machine drive; separating the current-sensor signal into current-sensor carrier signal negative sequence and current-sensor carrier signal positive sequence reference frames; generating a proportional compensator signal for a first one of the current-sensor carrier signal reference frames; and generating a magnitude signal of a second one of the current-sensor carrier signal reference frames.

One advantage of the present invention is that it substantially eliminates the need for post-production manual calibration of current-sensor signal conditioner devices. Additional advantages and features of the present invention will become apparent from the description that follows and may be realized by the instrumentalities and combinations particularly pointed out in the appended claims, taken in conjunction with the accompanying drawings.

DETAILED DESCRIPTION

The present invention is illustrated with respect to a method for current-sensor gain error compensation, particularly suited to the field of electric motors. The present invention is, however, applicable to various other uses that may require current-sensor gain error compensation, as will be understood by one skilled in the art.

Figure 1:
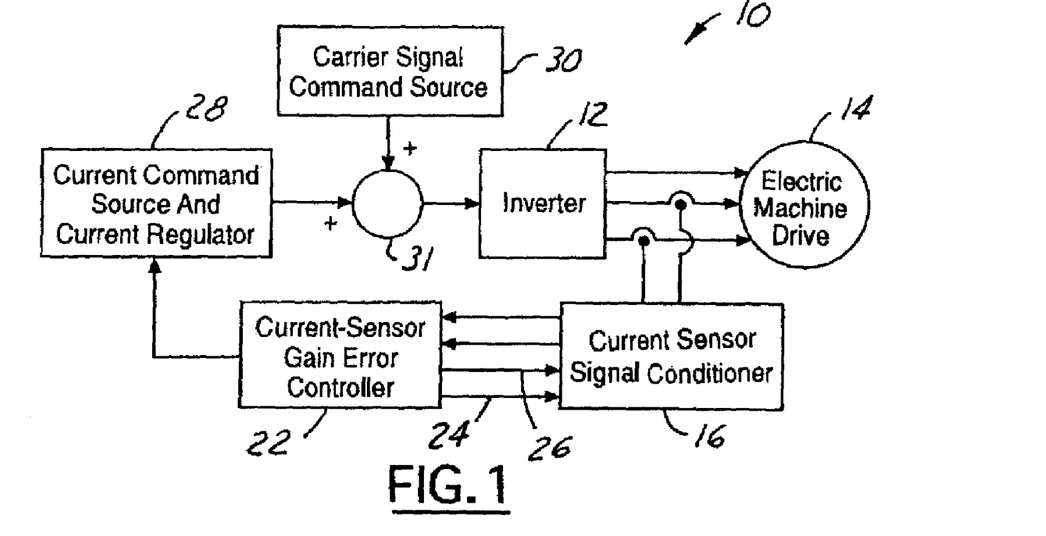
FIG. 1 is a compensation system for current-sensor gain error in accordance with a preferred embodiment of the present invention.

Referring to FIG. 1, a current-sensor gain error compensation system 10, incorporating an injected high frequency carrier signal, in accordance with a preferred embodiment of the present invention, is illustrated. The system 10 includes an inverter 12 electrically connected to and adapted to activate the electric machine 14. A current-sensor signal conditioner 16 is electrically coupled to the electric machine 14 and is adapted to approximate at least one current-sensor signal. The illustrated conditioner 16 approximates signals for two current-sensors. Alternate embodiments of the present invention, however, include current-sensors to determine the electric machine drive parameters. It should be understood that numerous sensor and sensor signal conditioners and combinations thereof are suitable for the invention.

A current-sensor gain error controller 22 is electrically coupled to the current-sensor signal conditioner 16 and is adapted to compensate for gain-error of the current-sensor signal conditioner 16. The current-sensor gain error controller 22 includes a first feedback loop 24 adapted to generate a proportional compensator signal for the current-sensor signal conditioner 16. The current-sensor gain error controller 22 further includes a second feedback loop 26 adapted to adjust the magnitude of the proportional compensator signal. The high frequency signal needed by the current-sensor gain error controller 22 is introduced in summing block 31, by summing the output voltage command from the Current Command Source and Current Regulator 28 and the injected high frequency signal from the Carrier Signal Command Source 30, substantially prior to reception in the inverter 12, as will be understood by one skilled in the art.

Figure 2:
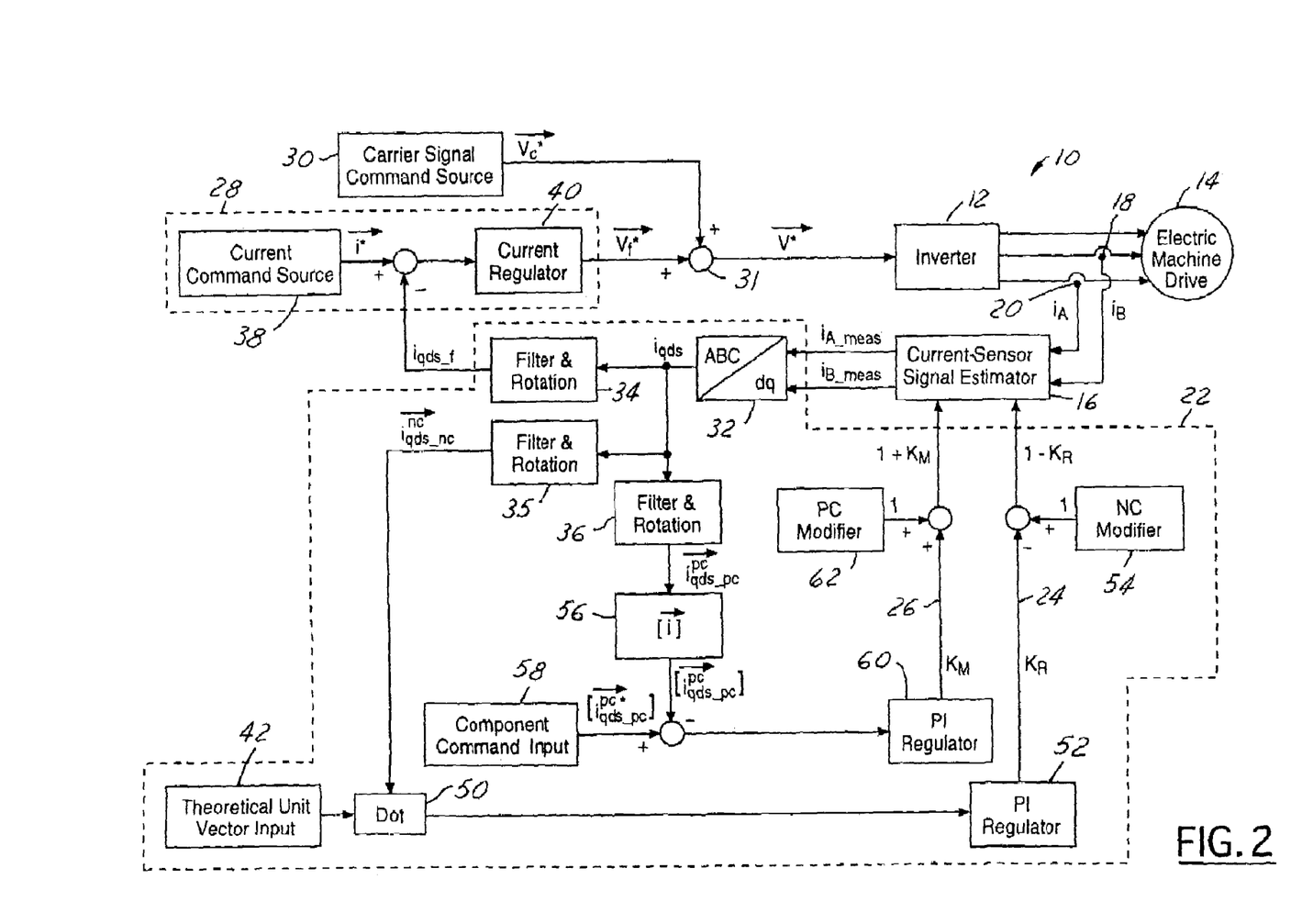
FIG. 2 is a compensation system for current-sensor gain error in accordance with a preferred embodiment of the present invention.
Figure 3:
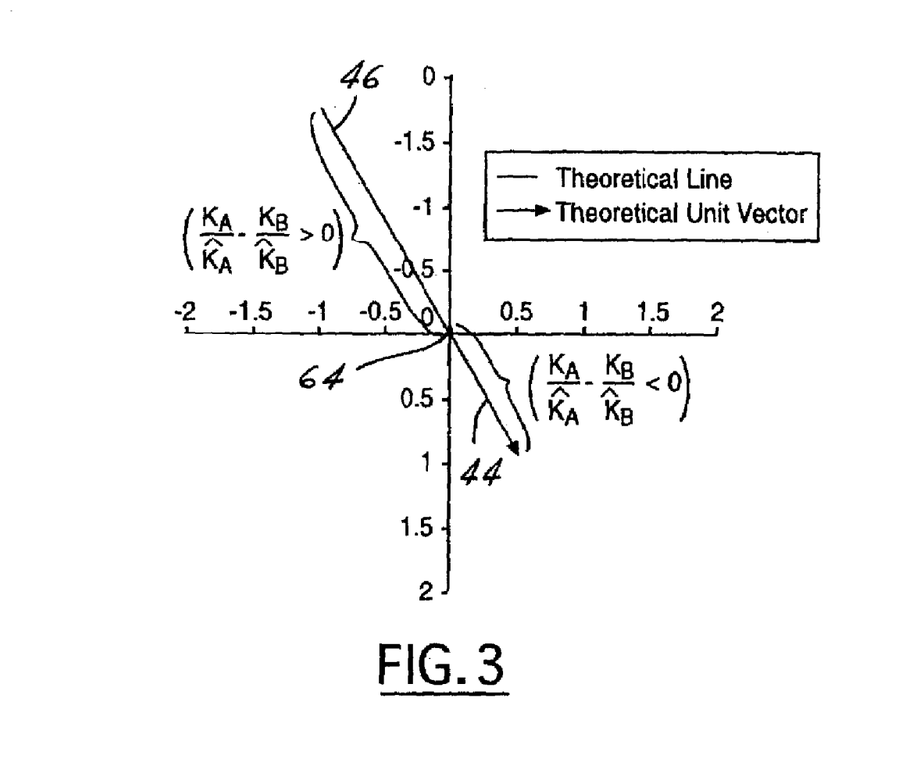
FIG. 3 is a graph of the theoretical unit vector in accordance with a preferred embodiment of the present invention.

Referring to FIG. 2 and FIG. 3, a compensation system 10 for current-sensor gain errors, in accordance with a preferred embodiment of the present invention, is illustrated. The system 10 includes the components of a generic Current Regulator 40 for an electric machine drive system along with modifications for carrier signal injection, measurement and compensation for gain error.

The system 10 includes a current-sensor signal conditioner 16. Current-sensor signal conditioners are well known in the art as devices for approximating parameters, such as current and phase angle, of electric machines. The current-sensor signal conditioner 16 is electrically coupled to the electric machine 14, here represented as a motor, and the current-sensor gain error controller 22.

The current-sensor gain error controller 22 modifies the signal generated in the current-sensor signal conditioner 16 to reduce gain error caused by, for example, device tolerances, temperature, aging and noise. The current-sensor gain error controller 22, in the present embodiment, includes an ABC/dq converter 32, which converts the signal from the current-sensor signal conditioner 16 from a three phase to a two phase signal using the ABC/dq transform, as will be understood by one skilled in the art. The resulting signal is split into a negative and a positive sequence component, as will be discussed later.

The current-sensor gain error controller 22 filters and rotates the signal, subsequent to splitting it into component parts and prior to summing it with the current command from the Current Command Source 38, in the Filter and Rotation blocks 34, 35 and 36.

The filter components of the Filter and Rotation blocks 34, 35 and 36 primarily limit the resulting signals due to saliencies caused from, for example, unbalanced electric machine excitation and machine system parameters, as will be understood by one skilled in the art. This isolates the desired components of the overall current signal. The rotation components of the Filter and Rotation blocks 34, 35 and 36 rotate the high frequency signal into the same reference frame as the current command vector (fundamental excitation), the Theoretical Unit Vector (negative sequence carrier signal) and the Component Command Input Vector (positive sequence carrier signal), as will be understood by one skilled in the art.

The injected carrier voltage induces a current in the electric machine 14. When the current-sensor gains are uncalibrated, this current includes two components: a positive rotating sequence, and a negative rotating sequence. It should be noted that negative rotating sequence currents also arise due to saliencies in the electric machine drive, e.g. an unbalanced load, or from an unbalanced excitation. Those due to saliencies are filtered off. Those due to an unbalanced excitation are rare and tend to point to an inverter problem. The aforementioned are distinguishable from the component due to current sensor gain errors.

A carrier signal voltage, $V_c^* = V_c e^{j\omega_c t}$, is injected from a Carrier Signal Command Source 30 and is superimposed on the fundamental voltage $V_f^* = V_f e^{j\omega_f t}$ in summing block 31, as illustrated. Note that $\omega_c >> \omega_f$, $\omega$ is the frequency, as will be understood by one skilled in the art. Only voltage injection is presented here, but the same estimation routines are alternately extended to current injection. The fundamental voltage is generated from the current input, $\vec{i}^*$, from the Current Command Source portion 38 of the Current Command Source and Current Regulator block 28 adapted through the Current Regulator 40. Alternate embodiments include look-up tables, or other forms of open loop operation, in place of a Current Regulator to determine the fundamental voltage, as will be understood be one skilled in the art.

The present invention includes an inverter 12 to convert the voltage command $\vec{v}^*$ into 3-phase AC voltage. The illustrated inverter 12 responds to signals from the Carrier Signal Command Source 30, the Current Command Source 38 and signals generated in the current-sensor gain error controller 22 to activate the electric machine 14.

The carrier signal voltage input to the electric machine 14 results in phase currents that have a carrier signal component in the form:

$$i_{A\_c} = I_c \cos(\omega_c t + \varphi), \tag{1}$$

$$i_{B\_c} = I_c \cos\left(\omega_c t + \varphi - \frac{2\pi}{3}\right), \text{ and} \tag{2}$$

$$i_{C\_c} = I_c \cos\left(\omega_c t + \varphi + \frac{2\pi}{3}\right). \tag{3}$$

Typically, only two of the three phase currents are measured and used for control. $i_A$ and $i_B$ are used as an illustrative example. Hardware gains and software gains modify each phase current. Hardware gains, such as current-sensor gains, analog-to-digital conversion and associated interface circuit gains, are represented by $K_A$ and $K_B$. Software gains contained in the system code are represented by $K_A$ and $K_B$. These gains are part of what describes the Current-Sensor Signal Conditioner. After modification by these gains in the current-sensor signal conditioner 16, the carrier signal component of the phase currents have the form:

$$i_{A\_meas\_c} = \frac{K_A}{\hat{K}_A} i_{A\_c} \text{ and} \tag{4}$$

-continued $$i_{B\_meas\_c} = \frac{K_B}{\hat{K}_B} i_{B\_c}. \quad (5)$$

Performing an ABC/dq transform, in the ABC/dq block 32, on equation (4) and equation (5) yields:

$$i_{qs\_c} = \frac{K_A}{\hat{K}_A} i_{A\_c} \text{ and} \quad (6)$$

$$i_{ds\_c} = \frac{-1}{\sqrt{3}}\left(\frac{K_A}{\hat{K}_A} i_{A\_c} + 2\frac{K_B}{\hat{K}_B} i_{B\_c}\right). \quad (7)$$

Then, by definition:

$$i_{qds\_c} = i_{qs\_c} - j i_{ds\_c} \quad (8)$$

Using equations (1), (2), (6), (7) and (8) in conjunction yields:

$$i_{qds\_c} = I_c \left\{ \frac{K_A}{\hat{K}_A} \cos(\omega_c t + \varphi) + \frac{j}{\sqrt{3}}\left[\frac{K_A}{\hat{K}_A}\cos(\omega_c t + \varphi) + 2\frac{K_B}{\hat{K}_B}\cos\left(\omega_c t + \varphi - \frac{2\pi}{3}\right)\right]\right\}. \quad (9)$$

Furthermore:

$$\cos\theta = \frac{e^{j\theta} + e^{-j\theta}}{2}, \quad (10)$$

$$e^{j2\pi/3} = -0.5 + j\frac{\sqrt{3}}{2}, \text{ and} \quad (11)$$

$$e^{-j2\pi/3} = -0.5 - j\frac{\sqrt{3}}{2}. \quad (12)$$

Applying equations (10), (11) and (12) to (9) produces the following:

$$i_{qds\_c} = \frac{I_c}{2}\left\{\left[\left(\frac{K_A}{\hat{K}_A} + \frac{K_B}{\hat{K}_B}\right) + j\frac{1}{\sqrt{3}}\left(\frac{K_A}{\hat{K}_A} - \frac{K_B}{\hat{K}_B}\right)\right]e^{j(\omega_c t + \varphi)} + \left(\frac{K_A}{\hat{K}_A} - \frac{K_B}{\hat{K}_B}\right) + j\frac{1}{\sqrt{3}}\left(\frac{K_A}{\hat{K}_A} - \frac{K_B}{\hat{K}_B}\right)\right]e^{-j(\omega_c t + \varphi)}\right\}. \quad (13)$$

At high frequencies, the impedance of the electric machine 14 is almost purely inductive. Therefore, for equations (1), (2), (3), (9) and (13):

$$\varphi \cong \frac{\pi}{2}. \quad (14)$$

One skilled in the art will understand that the load is purely inductive at high frequencies, and the current lags the voltage by approximately $\pi/2$, and the exponential factors are modified such that:

$$e^{j(\omega_c t + \phi)} = -je^{j\omega_c t} \text{ and} \quad (15)$$

$$e^{-j(\omega_c t + \phi)} = je^{-j\omega_c t}. \quad (16)$$

Applying equations (15) and (16) to (13) yields:

$$i_{qds\_c} = \frac{I_c}{2}\left\{\left[\frac{1}{\sqrt{3}}\left(\frac{K_A}{\hat{K}_A} - \frac{K_B}{\hat{K}_B}\right) - j\left(\frac{K_A}{\hat{K}_A} + \frac{K_B}{\hat{K}_B}\right)\right]e^{j\omega_c t} + \left[\frac{-1}{\sqrt{3}}\left(\frac{K_A}{\hat{K}_A} - \frac{K_B}{\hat{K}_B}\right) + j\left(\frac{K_A}{\hat{K}_A} - \frac{K_B}{\hat{K}_B}\right)\right]e^{-j\omega_c t}\right\}. \quad (17)$$

In equation (17), the positive rotating sequence terms are identified with $e^{j\omega_c t}$ as a factor, and the negative rotating sequence terms with $e^{-j\omega_c t}$ as a factor. The positive and negative sequence portions of equation (17) are shown below in equations (18) and (19) respectively:

$$i_{qds\_pc} = \frac{I_c}{2}\left[\frac{1}{\sqrt{3}}\left(\frac{K_A}{\hat{K}_A} - \frac{K_B}{\hat{K}_B}\right) - j\left(\frac{K_A}{\hat{K}_A} + \frac{K_B}{\hat{K}_B}\right)\right]e^{j\omega_c t} \text{ and} \quad (18)$$

$$i_{qds\_nc} = \frac{I_c}{2}\left[\frac{-1}{\sqrt{3}}\left(\frac{K_A}{\hat{K}_A} - \frac{K_B}{\hat{K}_B}\right) + j\left(\frac{K_A}{\hat{K}_A} - \frac{K_B}{\hat{K}_B}\right)\right]e^{-j\omega_c t}. \quad (19)$$

The negative sequence terms, in conjunction with the positive sequence terms, may be used to compensate for current-sensor gain errors. The negative sequence component is typically inactive when the system is operating properly. In equation (19), the negative sequence component is present due to differences in the gain ratios. If the gain ratios are made equal, as in equation (20), the negative sequence component becomes insignificant, $$\frac{K_A}{\hat{K}_A} = \frac{K_B}{\hat{K}_B}. \quad (20)$$

This condition also eliminates one of the positive sequence terms, leaving a single term, which is used to adjust both gain ratios to their correct values, $$i_{qds\_pc} = -j\frac{I_c}{2}\left(\frac{K_A}{\hat{K}_A} + \frac{K_B}{\hat{K}_B}\right)e^{j\omega_c t}. \quad (21)$$

In equation (21), the gain ratios may be modified to equal 1:

$$\frac{K_A}{\hat{K}_A} = \frac{K_B}{\hat{K}_B} = 1. \quad (22)$$

The magnitude of the positive sequence current then equals the desired current, $$|i_{qds\_pc}| = I_c. \quad (23)$$

In one embodiment of the present invention, iqds_c is separated into positive and negative sequence components in the controller. The positive sequence component, equation (18), is vector rotated in the Filter and Rotation block 36 into the positive sequence reference frame where it becomes a DC quantity. Similarly, the negative sequence component, equation (19), is vector rotated in the Filter and Rotation block 35, into the negative sequence reference frame where it also becomes a DC quantity. This rotation is shown in equations (24) and (25), respectively, $$i_{qds\_pc}^{pc} = \frac{I_c}{2}\left[\frac{1}{\sqrt{3}}\left(\frac{K_A}{\hat{K}_A} - \frac{K_B}{\hat{K}_B}\right) - j\left(\frac{K_A}{\hat{K}_A} + \frac{K_B}{\hat{K}_B}\right)\right] \quad (24)$$

$$i_{qds\_nc}^{nc} = \quad (25)$$
$$\frac{I_c}{2}\left[\frac{-1}{\sqrt{3}}\left(\frac{K_A}{\hat{K}_A} - \frac{K_B}{\hat{K}_B}\right) + j\left(\frac{K_A}{\hat{K}_A} - \frac{K_B}{\hat{K}_B}\right)\right] = \frac{I_c}{2}\left(\frac{K_A}{\hat{K}_A} - \frac{K_B}{\hat{K}_B}\right)\left(\frac{-1}{\sqrt{3}} + j\right).$$

As previously mentioned, the negative sequence terms in equation (25) drive the ratios of hardware gain to software gain for the equality of the two phases as shown in equation (20).

One embodiment of the current invention incorporates a Theoretical Unit Vector input block 42, which generates a Theoretical Unit Vector 44, as illustrated in FIG. 3. The Theoretical Unit Vector 44 is collinear with the Theoretical Line 46 derived from equation (25).

One method of driving the gain ratios to an equal state, as in equation (20), includes the measured value of $$i_{qds\_nc}^{nc}$$

compared by dot product (in the Dot product block 50) with the Theoretical Unit Vector 44. This comparison yields the signed magnitude of the error, which is then fed through a proportional plus integral regulator (PI Regulator 52) to produce the gain $K_R$ 24. $K_R$ is subtracted from 1, which is input from the Negative Component Modifier (NC Modifier 54), and used to force the gain ratios for phase A and B to become equal. This results in the minimization or elimination of the negative sequence component and one of the positive sequence component terms in equation (24).

Concurrently, the remaining positive sequence component is used to minimize the error between the commanded or expected carrier signal current and the realized phase currents. One embodiment includes $$|i_{qds\_pc}^{pc}|,$$

the magnitude of the measured positive sequence component, derived from the filtered and rotated signal from the Filter and Rotation block 36, and the magnitude block 56. The magnitude block 56 is referenced to the anticipated positive sequence component command $$|i_{qds\_pc}^{pc*}|,$$

which is input from the Component Command Input 58. The component command, $$|i_{qds\_pc}^{pc*}|,$$

is the value of the current when both the current sensor conditioners are correctly tuned. The difference between the anticipated positive sequence command and the measured positive sequence command, $$|i_{qds\_pc}^{pc*}| - |i_{qds\_pc}^{pc}|,$$

is fed through a proportional plus integral regulator (PI Regulator 60) to produce the gain $K_M$ 26. Then, $K_M$ is added to 1, which is input from the Positive Component modifier (PC modifier 62), and used to modify the overall magnitude of both phase currents.

The gains $K_M$ and $K_R$ modify the Current-sensor Signal Conditioner block output such that equations (4) and (5) become:

$$i_{A\_meas\_c} = (1 + K_M)\frac{K_A}{\hat{K}_A}i_{A\_c} \quad (26)$$

$$i_{B\_meas\_c} = (1 + K_M)(1 - K_R)\frac{K_B}{\hat{K}_B}i_{B\_c}. \quad (27)$$

This compensation method effect is seen through the following substitutions in any equation prior to equation (26): replacing $$\frac{K_A}{\hat{K}_A} \text{ with } (1 + K_M)\frac{K_A}{\hat{K}_A} \text{ and replacing}$$

$$\frac{K_B}{\hat{K}_B} \text{ with } (1 + K_M)(1 - K_R)\frac{K_B}{\hat{K}_B}.$$

Utilizing the aforementioned replacements in equation (25) yields:

$$i_{qds\_nc}^{nc} = \frac{I_c}{2}(1 + K_M)\left(\frac{K_A}{\hat{K}_A} - (1 - K_R)\frac{K_B}{\hat{K}_B}\right)\left(\frac{-1}{\sqrt{3}} + j\right) \quad (28)$$

To illustrate system 10 functions, $K_M = K_R = 0$. This is representative of either the initial conditions of the system 10 at startup or when the system 10 is fully compensated prior to a disturbance causing current gain errors. In either case the negative sequence component, equation (28), is temporarily equal to equation (25) and $$\left(\frac{K_A}{\hat{K}_A} - (1 - K_R)\frac{K_B}{\hat{K}_B}\right) = \left(\frac{K_A}{\hat{K}_A} - \frac{K_B}{\hat{K}_B}\right).$$

There are two scenarios during which gain ratio errors exist, $$\left(\frac{K_A}{\hat{K}_A} - \frac{K_B}{\hat{K}_B}\right) < 0 \text{ and } \left(\frac{K_A}{\hat{K}_A} - \frac{K_B}{\hat{K}_B}\right) > 0.$$

For situations in which the measured $$i^{nc}_{qds\_nc}$$

is in the upper left quadrant of FIG. 3, the initial gain ratios are such that $$\left(\frac{K_A}{\hat{K}_A} - \frac{K_B}{\hat{K}_B}\right) > 0.$$

Referring to FIG. 2, a dot product is performed on the Theoretical Unit Vector 44 and $$i^{nc}_{qds\_nc},$$

which yields a negative value. This value is fed through the PI Regulator 52 producing a negative $K_R$ that will force $$\left(\frac{K_A}{\hat{K}_A} - (1-K_R)\frac{K_B}{\hat{K}_B}\right)$$

from equation (29) to decrease in positive value. This process forces $$i^{nc}_{qds\_nc}$$

toward the origin 64 in FIG. 3, reducing the negative sequence current magnitude.

A similar algorithm is obtained for the situation where $$\left(\frac{K_A}{\hat{K}_A} - \frac{K_B}{\hat{K}_B}\right) < 0.$$

Once $$\left(\frac{K_A}{\hat{K}_A} - (1-K_R)\frac{K_B}{\hat{K}_B}\right) = 0,$$

the negative sequence component and at least one term of the positive sequence component tend to vanish. During operation of the aforementioned, $K_M$ is used to force the magnitude of the positive sequence current to equal a current with substantially reduced or eliminated gain error.

Using equation (27) in equation (24) once the negative sequence component has been eliminated, and with $$\frac{K_A}{\hat{K}_A} = (1-K_R)\frac{K_B}{\hat{K}_B}, \text{ yields:} \tag{29}$$

-continued $$i^{pc}_{qds\_pc} = -j\frac{I_c}{2}(1+K_M)\left(\frac{K_A}{\hat{K}_A} + (1-K_R)\frac{K_B}{\hat{K}_B}\right) = -j\frac{I_c}{2}(1+K_M)$$

$$\left(2\frac{K_A}{\hat{K}_A}\right) = -jI_c(1+K_M)\left(\frac{K_A}{\hat{K}_A}\right).$$

This leads to:

$$|i^{pc}_{qds\_pc}| = I_c(1+K_M)\left(\frac{K_A}{\hat{K}_A}\right). \tag{30}$$

When $$|i^{pc}_{qds\_pc}|,$$

the measured positive sequence component magnitude described in equation (30), is less than the magnitude of the anticipated positive sequence component command, $$|i^{pc*}_{qds\_pc}|,$$

then $K_M$ is positive, which increases $$|i^{pc}_{qds\_pc}|.$$

Similarly, when $$|i^{pc}_{qds\_pc}| > |i^{pc*}_{qds\_pc}|,$$

then $K_M$ is negative, which decreases $$|i^{pc}_{qds\_pc}|.$$

The aforementioned continues until $$|i^{pc}_{qds\_pc}| = |i^{pc*}_{qds\_pc}|.$$

At this point, the gain ratios are compensated for, such that they are equal, and the measured current is equal to the anticipated current command. In other words, the current-sensor gains have been fully and accurately calibrated.

Figure 4A:
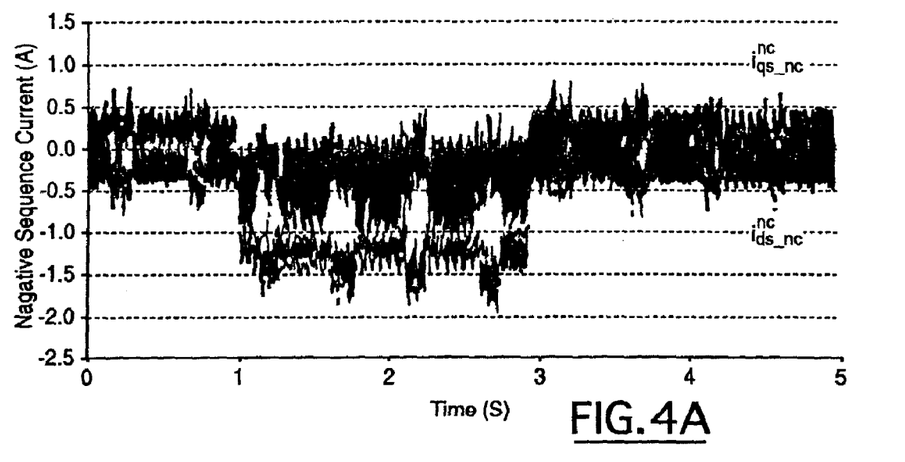
FIG. 4a is a graph of a negative sequence current.
Figure 4B:
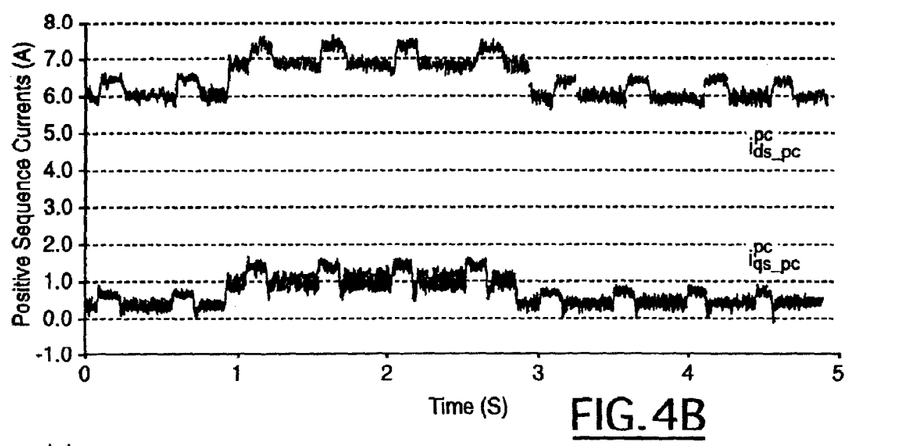
FIG. 4b is a graph of a positive sequence current.
Figure 4C:
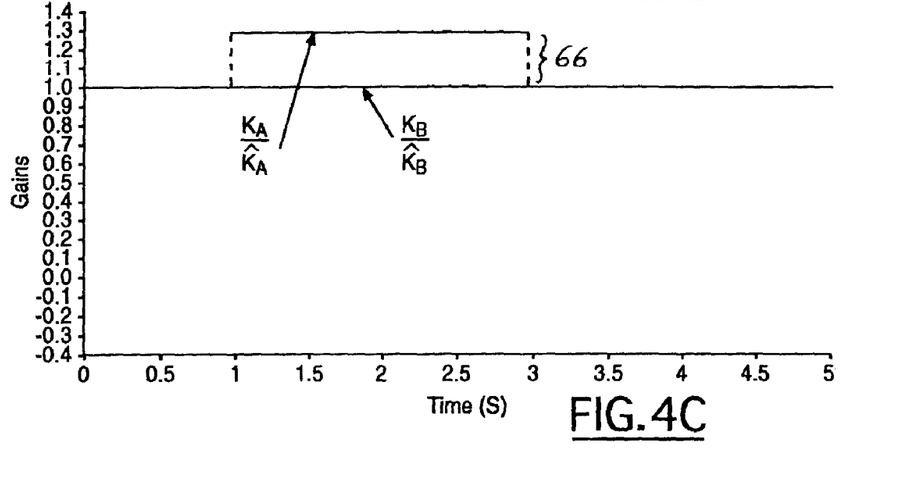
FIG. 4c is a graph of the result of a current-sensor gain error for the negative sequence current of FIG. 4a and the positive sequence current of FIG. 4b without a compensation system enabled.

Referring to FIG. 4c, a graph of the result of a current-sensor gain error without a compensation system enabled is illustrated. More specifically, FIG. 4c illustrates the result when a system is perturbed by an increase 66 of 30% in one of the gain ratios, namely $$\frac{K_A}{\hat{K}_A},$$

while the current-sensor gain error compensation algorithm, which employs the $K_R$ and $K_M$ feedback loops, is not enabled. The corresponding changes in both the positive (FIG. 4b) and negative (FIG. 4a) sequence currents, that occur in a system that has no compensation for current-sensor gain errors, is illustrated.

Figure 5A:
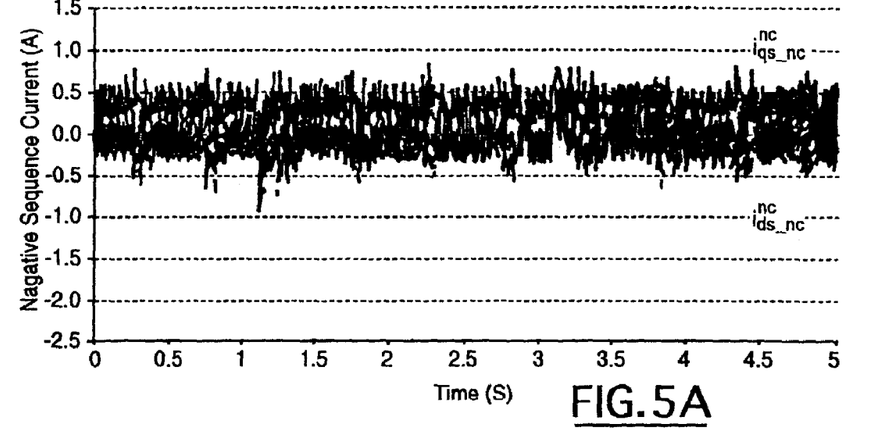
FIG. 5a is a graph of a negative sequence current.
Figure 5B:
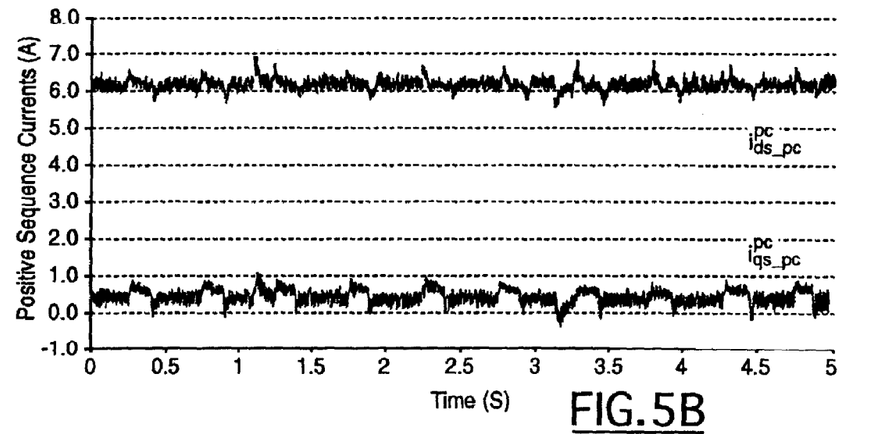
FIG. 5b is a graph of a positive sequence current.
Figure 5C:
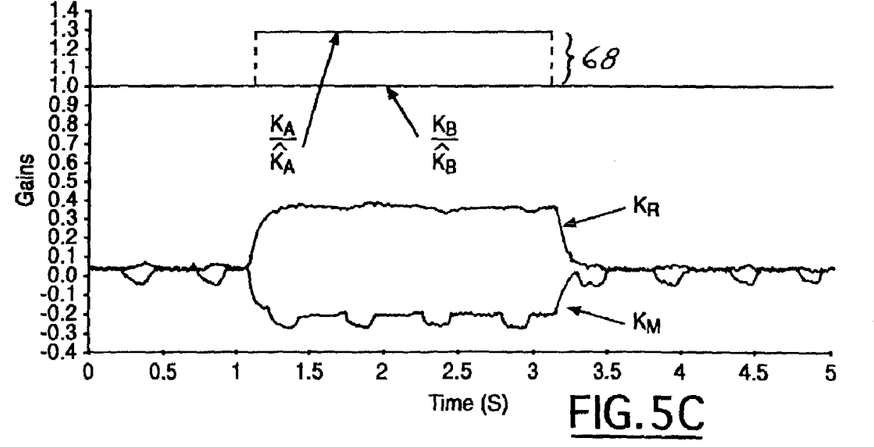
FIG. 5c is a graph of the result of a current-sensor gain error compensation system compensating for current-sensor gain error for the negative sequence current of FIG. 5a and the positive sequence current of FIG. 5b in accordance with a preferred embodiment of the present invention.

Referring to FIG. 5c, a graph of the result of a current-sensor gain error compensation system compensating for current-sensor gain error, in accordance with a preferred embodiment of the present invention, is illustrated. In other words, FIG. 5c illustrates the response for the same 30% gain ratio perturbation 68

$$\left(\text{i.e. } \frac{K_A}{\hat{K}_A} \text{ increase over } \frac{K_B}{\hat{K}_B}\right)$$

as in FIG. 4c, with the compensation algorithm enabled. $K_R$ and $K_M$ change in response to the disturbance to compensate for the induced error. The positive sequence currents (FIG. 5b) are maintained at their anticipated values after an initial spike due to the perturbation. Similarly, the negative sequence currents (FIG. 5a) spike momentarily, and then return to the near zero value they had prior to the perturbation. The system response time is on the order of 250 ms due to the tuning of the PI Regulators 52, 60. This elicits a relatively quick response without smoothing the currents unnecessarily.

Figure 6A:
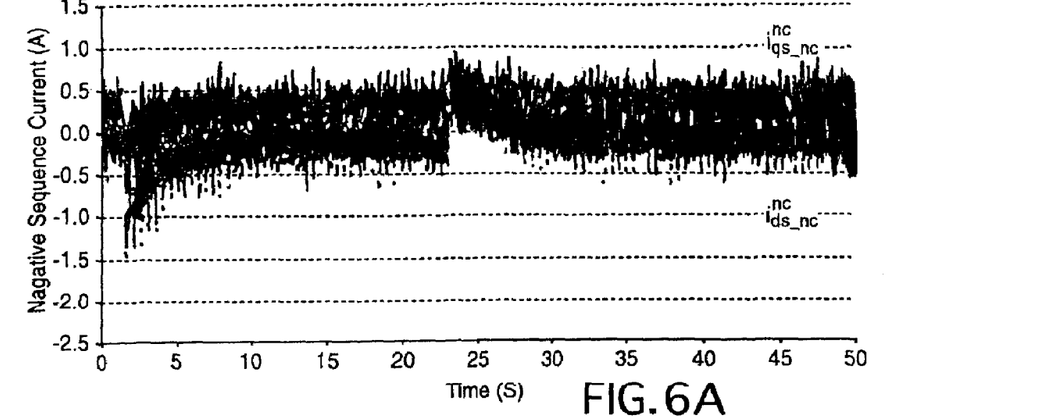
FIG. 6a is a graph of a negative sequence current.
Figure 6B:
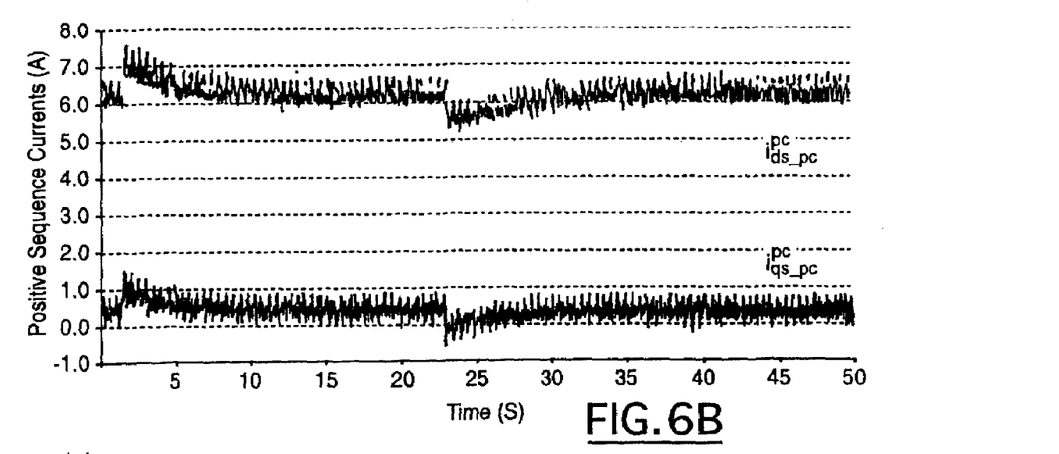
FIG. 6b is a graph of a positive sequence current.
Figure 6C:
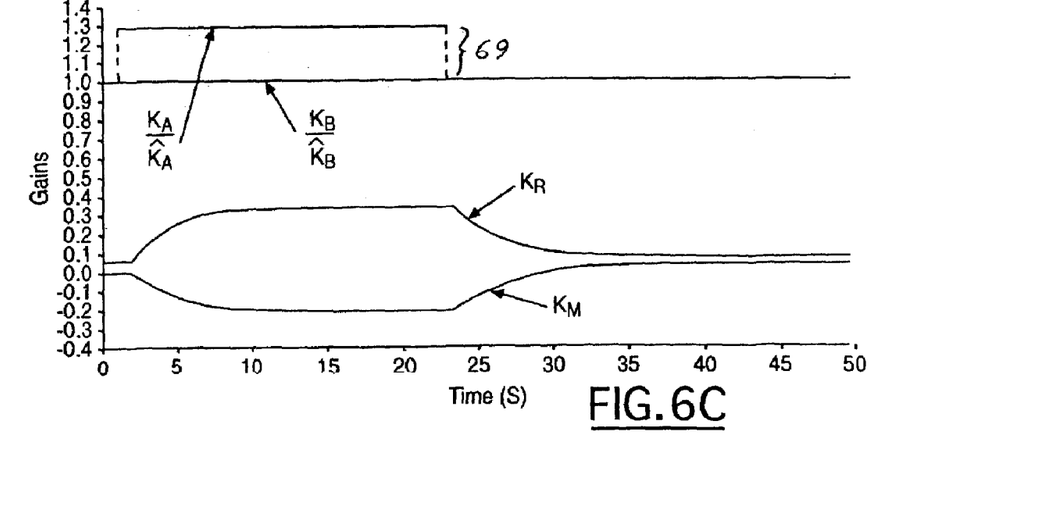
FIG. 6c is a graph of the result of a current-sensor gain error compensation system compensating for current-sensor gain error for the negative sequence current of FIG. 6a and the positive sequence current of FIG. 6b in accordance with a preferred embodiment of the present invention.

Referring to FIG. 6c, a graph of the result of a current sensor gain error compensation system compensating for the same 30% perturbation 69 as in FIGS. 4a and 4b with the PI Regulators tuned for a substantially slower response, as will be understood by one skilled in the art. The positive sequence currents (FIG. 6b) and the negative sequence currents (FIG. 6a) experience larger spikes of longer duration in regards to the lowered bandwidth of the PI Regulators 52, 60 but return the pre-perturbation valve.

Figure 7A:
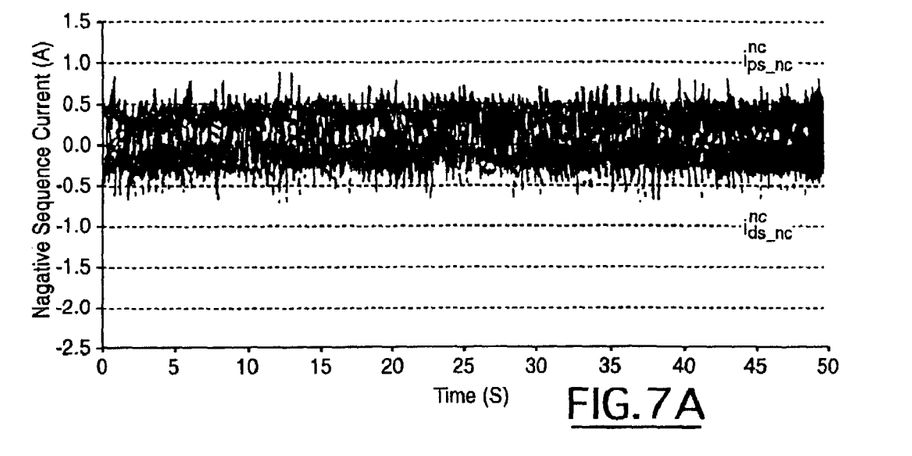
FIG. 7a is a graph of a negative sequence current.
Figure 7B:
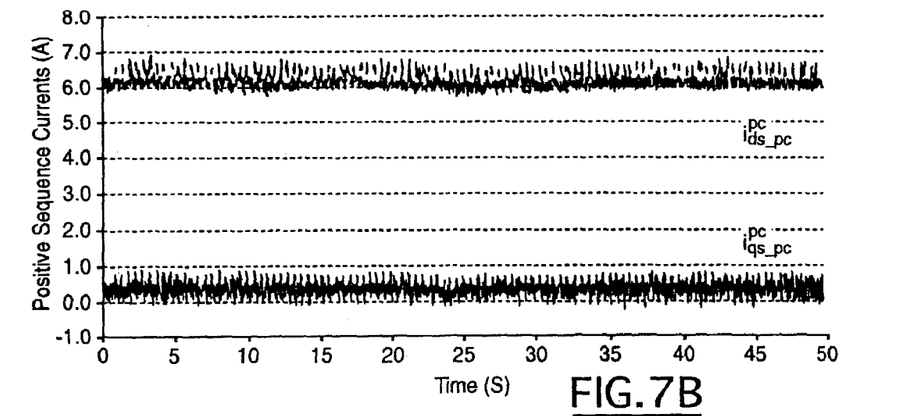
FIG. 7b is a graph of a positive sequence current.
Figure 7C:
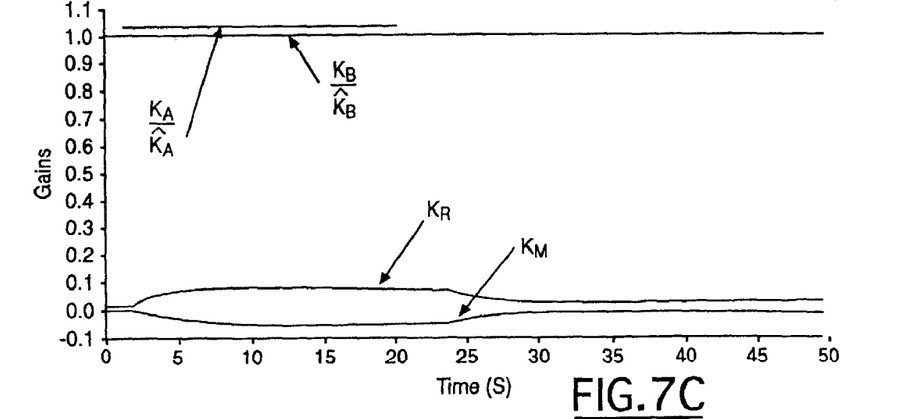
FIG. 7c is a graph of the result of a current-sensor gain error compensation system compensating for small current-sensor gain error for the negative sequence current of FIG. 7a and the positive sequence current of FIG. 7b in accordance with a preferred embodiment of the present invention.

Referring to FIG. 7c, a graph of the result of a current-sensor gain error compensation system compensating for small current-sensor gain error 72, in accordance with a preferred embodiment of the present invention, is illustrated. FIG. 7c demonstrates the ability of the system 10 to track and adjust to small perturbations or gain errors in the positive sequence currents (FIG. 7b) and the negative sequence currents (FIG. 7a) on the order of 5%

$$\frac{K_A}{\hat{K}_A}$$

increase over $$\frac{K_B}{\hat{K}_B}.$$

Figure 8A:
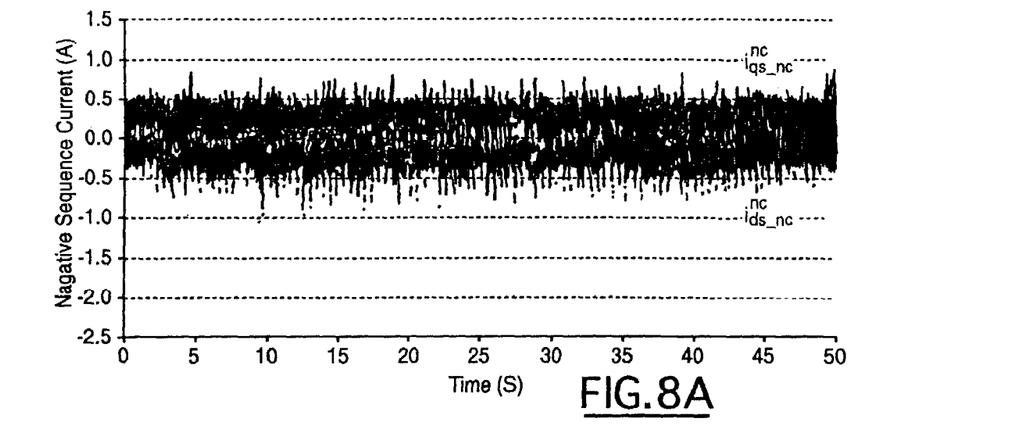
FIG. 8a is a graph of a negative sequence current.
Figure 8B:
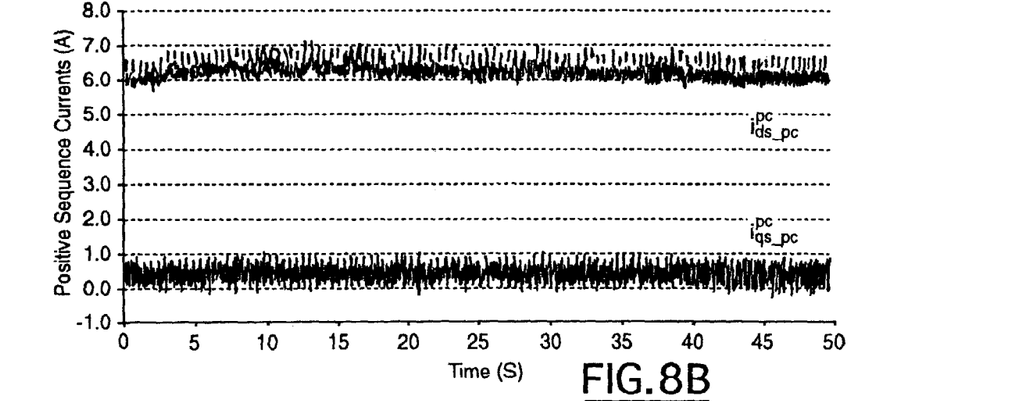
FIG. 8b is a graph of a positive sequence current.
Figure 8C:
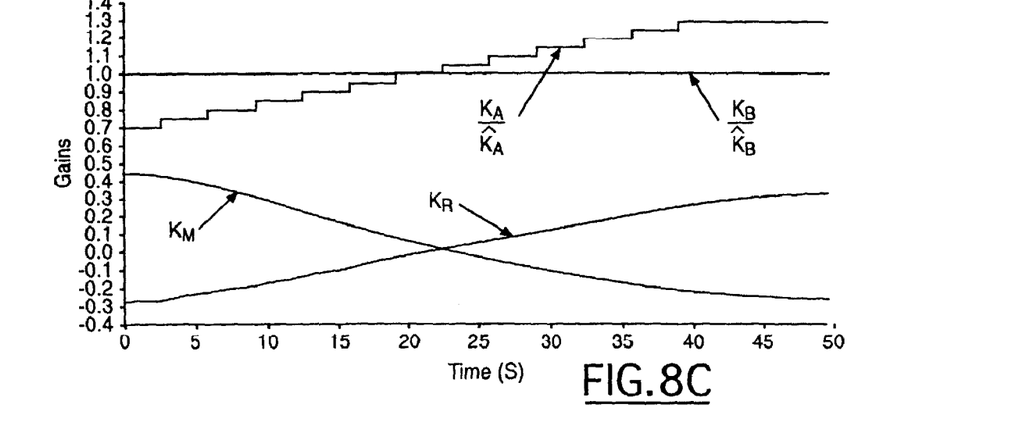
FIG. 8c is a graph of the result of a current-sensor gain error compensation system compensating for stepped-ramp current-sensor gain error for the negative sequence current of FIG. 8a and the positive sequence current of FIG. 8b in accordance with a preferred embodiment of the present invention.

Referring to FIG. 8c, a graph of the result of a current-sensor gain error compensation system compensating for stepped-ramp current-sensor gain error, in accordance with a preferred embodiment of the present invention, is illustrated. Large step changes to the gain ratios are unlikely in a real system, however they further illustrate the response of the system 10. FIG. 8c shows the system 10 response to a stepped-ramp change in the gain ratios (i.e.

$$\frac{K_A}{\hat{K}_A}$$

is the step change over $$\frac{K_B}{\hat{K}_B}).$$

$K_R$ and $K_M$ track the induced gain errors and show that, although the steps in the ramp are faster than the PI regulator bandwidth, the bandwidth is sufficient to track slowly varying current-sensor gain errors in the positive sequence currents (FIG. 8b) and the negative sequence currents (FIG. 8a). While the currents demonstrate variability around compensated values for the gain error, they are generally compensated for.

Figure 9:
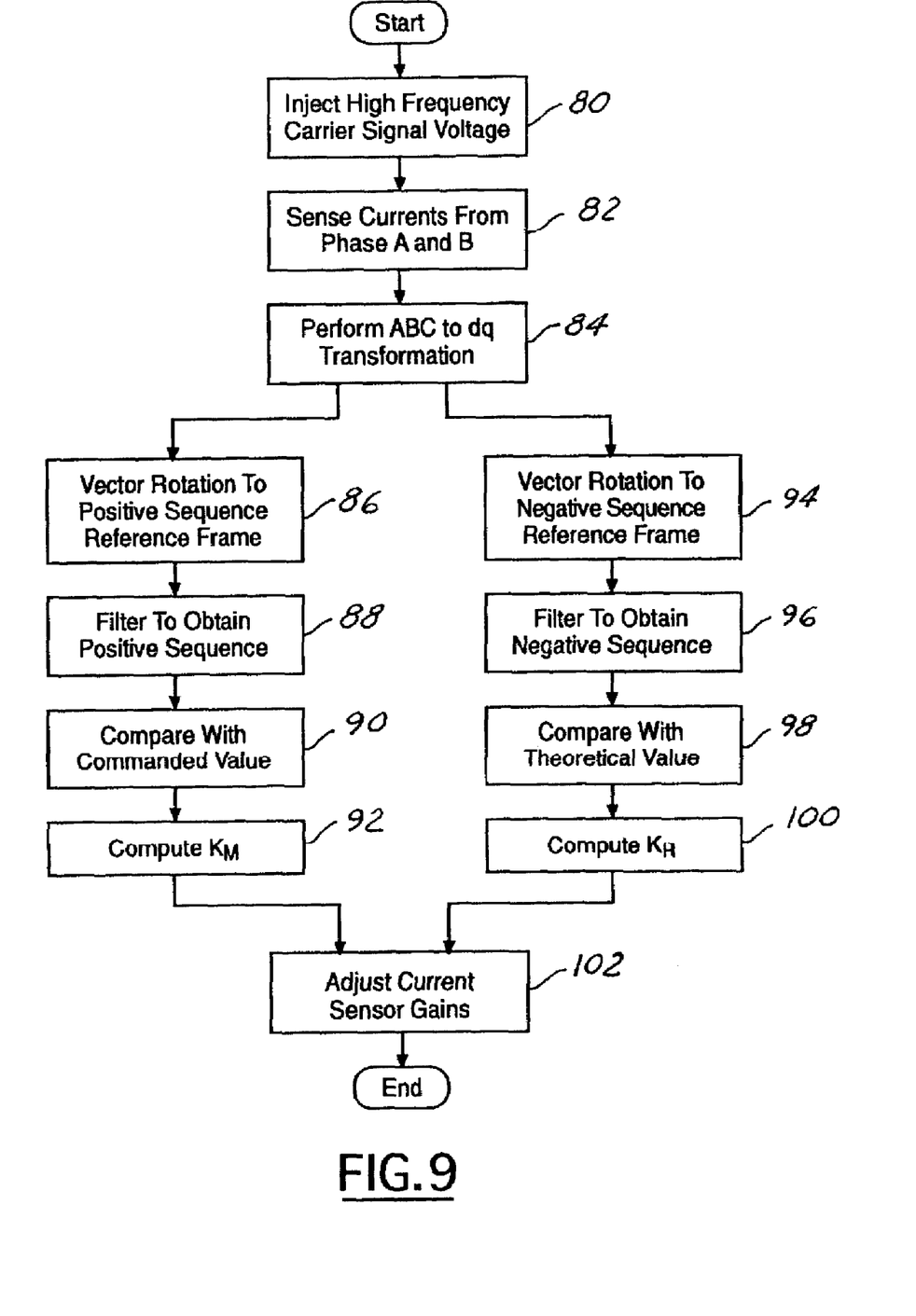
FIG. 9 is a block diagram of a method for current-sensor gain error compensation in accordance with a preferred embodiment of the present invention system.

Referring to FIG. 9, a block diagram of a method for current-sensor gain error compensation, in accordance with a preferred embodiment of the present invention, is illustrated.

Logic starts in inquiry block 80 where a high frequency carrier signal voltage is injected into the electric machine drive. The electric machine drive is excited by the sum of the fundamental voltage and the carrier signal voltage.

Operation block 82 then activates, and currents from phases in the electric machine (e.g. A and B, as discussed previously) are sensed by current-sensors. The resulting signal is transformed from a three phase into a two phase signal in operation block 84 through, for example, an ABC/dq transformation.

The transformed signal is then either sent to the current regulator, or split into positive and negative sequence components. In other words, in operation block 86, the signal is vector rotated into a positive sequence reference frame, and, in operation block 94, the signal is vector rotated into a negative sequence reference frame.

The vector signal from operation block 86 is then filtered in operation block 88 to obtain a positive sequence. A magnitude compensator signal is then generated in operation block 92 from a comparison of the measured carrier signal positive sequence component magnitude with the anticipated carrier signal positive sequence component magnitude conducted in operation block 90.

The vector signal from operation block 94 is filtered in operation block 96 to obtain a negative sequence. Operation block 98 then activates and a proportional compensator signal is generated for the negative sequence reference frame through a comparison of the negative sequence to the theoretical unit vector. The proportional signal is then computed in operation block 100.

The magnitude signal from operation block 92 and the proportional signal from operation block 100 are then combined in operation block 102 to adjust current-sensor gains.

In operation, the Carrier signal is summed with the fundamental voltage. This resulting voltage is received in the inverter, which converts it into an AC signal, which activates the electric machine. Current signals are measured and conditioned and, split into positive and negative sequence components. The carrier signal positive sequence component is fed through a controller loop where it is compared with a Component Command. The resulting signal is sent through a PI Regulator, and results in a signal to compensate for the magnitude of the current signal gain error. The carrier signal negative sequence component is fed through another controller loop where it is compared with a Theoretical Unit Vector and also sent through a PI Regulator. The resulting signal proportionally compensates for gain error in current-sensor data.

From the foregoing, it can be seen that there has been brought to the art a new system and method of compensation for current-sensor gain errors in an electric machine drive. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims.

What is claimed is:

1. A method of compensation for current-sensor gain errors in an electric machine drive comprising:
   activating the electric machine drive;
   electrically injecting a high frequency carrier signal into the electric machine;
   determining a current-sensor signal of the electric machine drive;
   separating said current-sensor signal into current-sensor carrier signal negative and current-sensor carrier signal positive sequence reference frame components;
   generating a proportional compensator signal for a first one of said current-sensor carrier signal reference frame components through a comparison of said first one of said current-sensor carrier signal reference frame components with a theoretical unit vector; and
   generating a magnitude signal of a second one of said current-sensor carrier signal reference frame components.

2. The method of claim 1 wherein electrically injecting a high frequency carrier signal further comprises injecting a voltage signal.

3. The method of claim 1 wherein electrically injecting a high frequency carrier signal further comprises injecting a current signal.

4. The method of claim 1 wherein separating further comprises separating said current-sensor signal into current-sensor carrier signal negative and current-sensor carrier signal positive sequence reference frame components through vector rotation.

5. The method of claim 1 wherein generating the proportional compensator signal further comprises generating the magnitude signal of a second one of said current-sensor carrier signal reference frame components through a comparison of the second one of said current-sensor carrier signal reference frame components with an anticipated sequence component command.

6. The method of claim 1 further comprising performing a transform on said current-sensor signal.

7. The method of claim 1 wherein separating further comprises filtering said current-sensor carrier signal negative sequence reference frame component.

8. The method of claim 1 wherein separating further comprises filtering said current-sensor carrier signal positive sequence reference frame component.

9. The method of claim 1 wherein determining the current-sensor signal further comprises conditioning said current-sensor signal.

10. The method of claim 1 wherein determining the current-sensor signal further comprises sensing said current-sensor signal.

11. A compensation system for current-sensor gain errors in an electric machine drive incorporating an injected high frequency carrier signal comprising:
    an inverter, electrically coupled to the electric machine and adapted to activate the electric machine;
    a current-sensor signal conditioner, electrically coupled to the electric machine, adapted to generate at least one current-sensor signal; and
    a controller, electrically coupled to the current-sensor signal conditioner and adapted to compensate for gain-error of said current-sensor signal conditioner, comprising a first feedback loop adapted to generate a proportional compensator signal from a negative sequence component of said current-sensor signal for said current-sensor signal conditioner, wherein said first feedback loon further comprises a comparison of a theoretical unit vector and said negative sequence component of said current-sensor signal, said controller further comprising a second feedback loop adapted to adjust a magnitude of said proportional compensator signal from a positive sequence component of said current-sensor signal.

12. The system of claim 11 wherein said electric machine comprises a motor.

13. The system of claim 11 wherein said current-sensor signal generator comprises a current-sensor signal conditioner.

14. The system of claim 11 wherein said current-sensor signal generator comprises a current-sensor.

15. The system of claim 11 wherein said second feedback loop further comprises a comparison of a component command and said positive sequence component of said current-sensor signal.

16. A method of compensation for current-sensor gain errors in an electric machine drive comprising:
    activating the electric machine drive;
    electrically injecting a high frequency carrier signal into the electric machine;
    calculating a current-sensor signal of the electric machine drive;
    separating said current-sensor signal into current-sensor carrier signal negative and current-sensor carrier signal positive sequence reference frame components through vector rotation of said current-sensor signal;
    generating a proportional compensator signal for a first one of said current-sensor carrier signal reference frame components through a comparison of said first one of said current-sensor carrier signal reference frame components with a theoretical unit vector; and
    generating a magnitude signal of a second one of said current-sensor carrier signal reference frame components through a comparison of said second one of said current-sensor carrier signal reference frame components with a sequence component command.

17. The method of claim 16 further comprising performing a transform on said current-sensor signal to obtain a transformed current sensor signal.

18. The system of claim 17 further comprising separating said transformed current-sensor carrier signal into transformed current-sensor carrier signal negative and transformed current-sensor carrier signal positive sequence reference frames through vector rotation of said transformed current-sensor signal.

* * * * *